United States Patent Office 3,517,311
Patented June 23, 1970

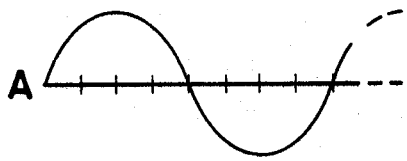
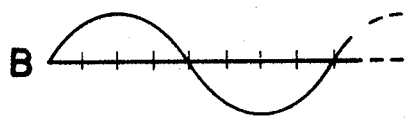
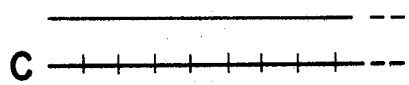
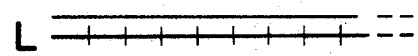
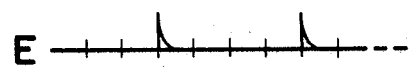
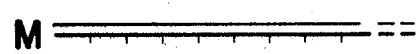
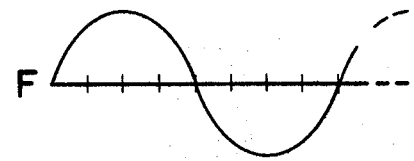
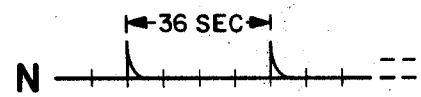
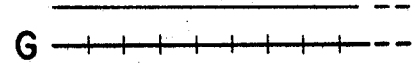
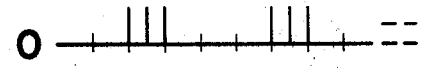
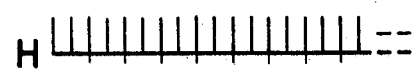
FIG. 5

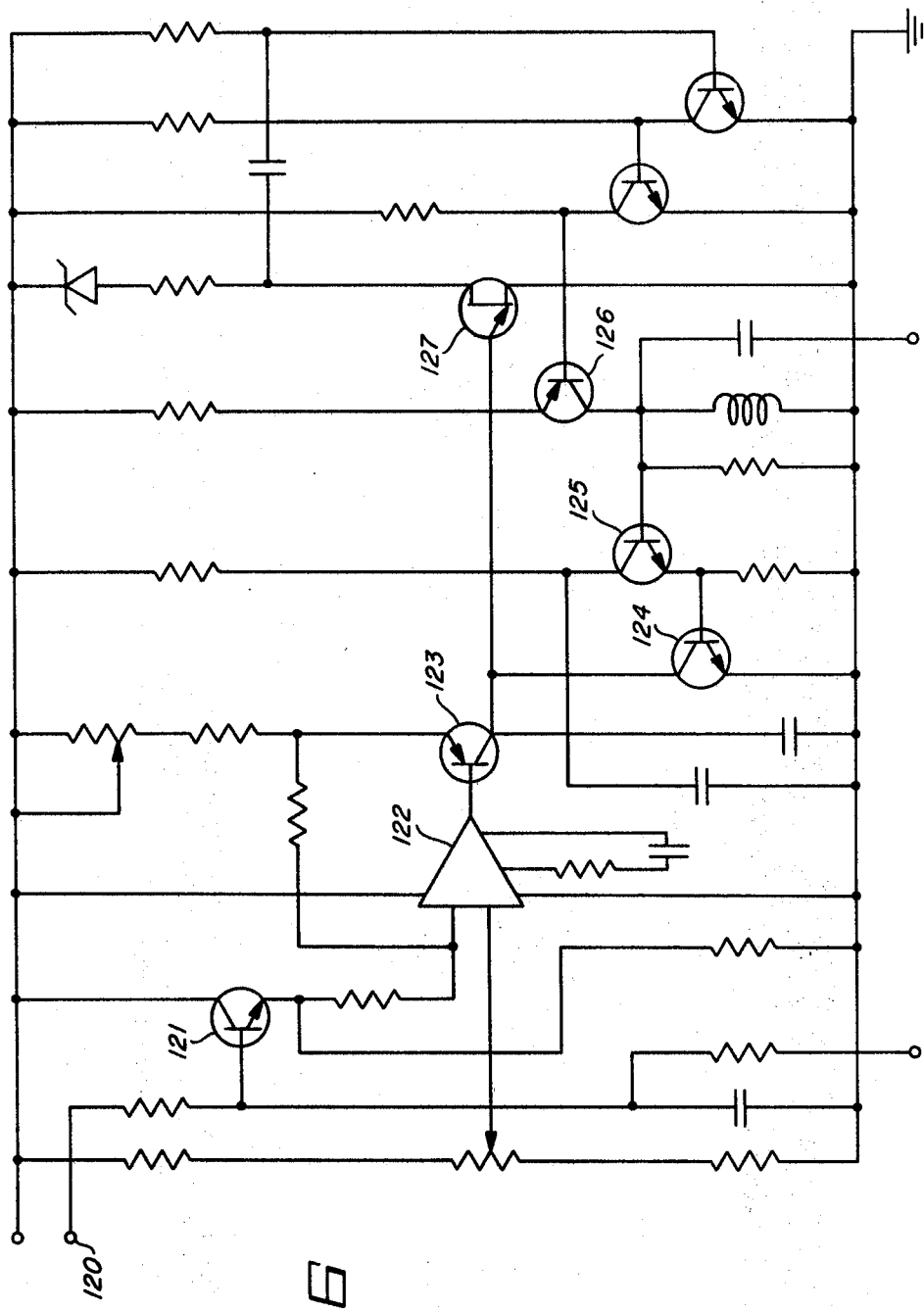

3,517,311
PULSE ACCUMULATING WATT-HOUR
MEASURING SYSTEM
John Paul Wasielewski, Scottsdale, and William L.
McAtee, Tempe, Ariz., assignors to Pranor Industries, Inc., a corporation of Delaware
Filed Dec. 26, 1968, Ser. No. 786,876
Int. Cl. G01r 21/00
U.S. Cl. 324—142       5 Claims

ABSTRACT OF THE DISCLOSURE

A system for accumulating pulses indicative of power consumption by measuring the voltage and current, comparing square wave representations of both and developing a direct current level proportional of the cosine of the angle between the two. The DC level is utilized to modify the amplitude of the measured alternating current voltage; the modified voltage together with a voltage representing measured current are rectified and applied to separate voltage controlled oscillators. The pulse output of one of the voltage controlled oscillators is accumulated and sampled at predetermined intervals; the number stored pulses determines the time duration of the opening of a gate to permit pulses from the other voltage controlled oscillator to pass. The pulses passing the gate are stored and remain available for access upon a request signal from a remote station.

---

The present invention pertains to watt-hour measuring systems, and more particularly, to a system for measuring and storing an idication of power consumption for subsequent readout from a remote station.

Many attempts have been made to provide a satisfactory remote reading power measurement system; difficulties have been encountered that have prevented these systems from being adopted. Two principal disadvantages are presented by prior art attempts at automatic read out of remote power measurement devices. Specifically, the use of the present watt-hour meters has represented the most common approach resulting in a variety of complex and relatively unreliable mechanisms which attempt to read the visual settings of the dial of the conventional watt-hour meter. Departures from the use of a conventional watt-hour meter have resulted in complex systems in which the accuracy of the specific electronic components has dictated a prohibitive cost.

The second chief disadvantage of prior art approaches is the inability, at reasonable cost, to achieve an electrical output in storable form such as pulse indicative trical output in storable form such as pulses indicative out of an accumulator.

It is therefore an object of the present invention to provide a power consumption measuring system ultilizing all electronic components without the disadvantages of moving parts such as present watt-hour meters.

It is another object of the present invention to provide a watt-hour measuring system that can economically be constructed to provide reliable remote readout.

It is still another object of the present invention to provide a watt-hour measuring system capable of taking advantage of solid state and integrated circuit technology to yield a compact economical system.

It is still another object of the present invention to provide a watt-hour measuring system wherein the power consumption is derived through the utilization of a pulse storage and timed sampling technique to provide accuracy to whatever extent deemed necessary under the circumstances surrounding the use of the system.

These and other objects of the present invention will become apparent to those skilled in the art as the description thereof proceeds.

Briefly, in accordance with the embodiment chosen for illustration, a voltage transformer is utilized to derive an AC voltage, the amplitude of which is proportional to the amplitude of the voltage on the power transmission lines to which the system is connected. The voltage wave is amplitude modified in a cosine multiplier to produce an AC wave form having an amplitude proportional to the product of the voltage and the cosine of the angle ($\theta$) between the voltage and current on the power transmission lines. The modified voltage wave form is subsequently rectified to provide a DC level for application to a voltage controlled oscillator. The oscillator produces a series of constant amplitude pulses, the frequency or pulse rate of which are inversely proportional to the DC level applied thereto. Thus, the pulses at this point are inversely proportional to the amplitude of the product $E \cos \theta$. The pulses are subsequently applied to an accumulator for temporary storage.

A current transformer is inductively coupled to the power transmission lines to produce an AC voltage wave form having an amplitude proportional to the current being carried by the transmission lines. This voltage wave form is rectified to produce a DC voltage level which is applied to a second voltage controlled oscillator. The output of the latter oscillator is a series of constant amplitude pulses, the frequency of which is directly proportional to the amplitude of the input DC level; thus, the second series of pulses includes a pulse rate or frequency directly proportional to the current being carried by the transmission lines. The second series of pulses is applied to a gate which is opened and closed at predetermined intervals, each interval extending for a timed duration depending on the number of pulses from the first voltage controlled oscillator that were stored in the accumulator. The rate of sampling depends upon the accuracy required of the system.

The output of the gate may be seen to be successive groups of pulses, the frequency of the groups being equal to the sampling rate and the number of pulses in each group occurring at a frequency equal to the frequency of the pulses of the second voltage controlled oscillator while the number of pulses in each group is a direct measurement of consumed power. These groups of pulses are subsequently stored and rendered available for readout upon command from a remote station.

The present invention may more readily be described by reference to the accompanying drawings, in which:

FIG. 5 is a diagram illustrating wave forms useful in the description of the operation of the system of the present invention.

FIG. 6 is a schematic circuit diagram of the circuit for use in the block diagram of FIG. 1.

Figure 1:
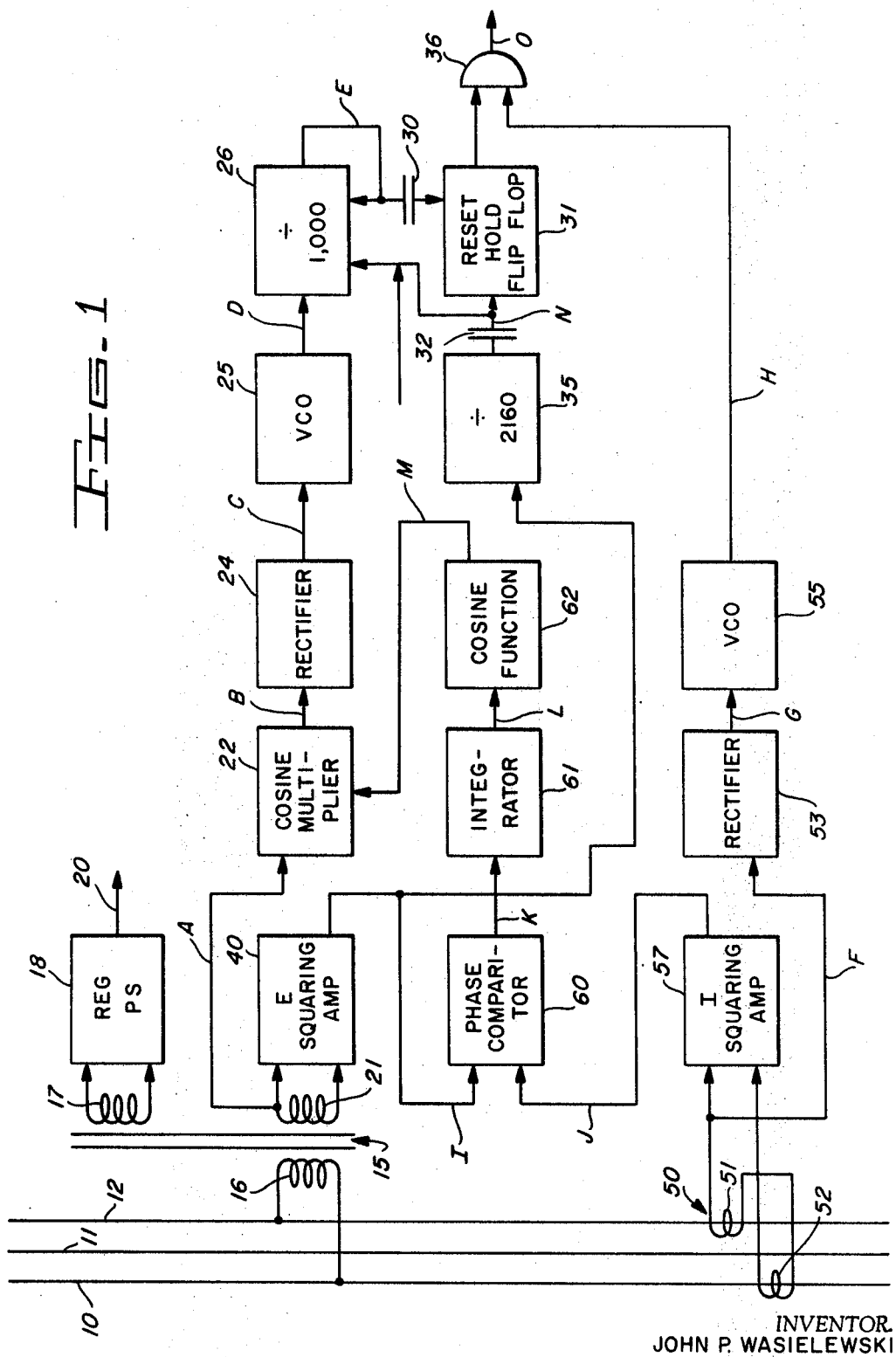
FIG. 1 is a block diagram of a power measurement system constructed in accordance with the teachings of the present invention.

Referring now to FIG. 1, conductors or power lines 10, 11 and 12 represent a single phase three-wire power transmission system wherein the conductor 11 is designated the neutral. A voltage transformer 15 includes a primary winding 16 connected to conductors 10 and 12.

A secondary winding 17 provides power to a regulated power supply 18 which subsequently may be utilized to provide appropriate energization of the various electrical circuits of the system, the connection to the circuits being indicated schematically by the arrow 20. Another secondary winding 21 of the transformer 15 develops an AC voltage wave form which, since it was induced by the primary winding 16 connected to the conductors 10 and 12, has an amplitude proportional to the amplitude of the voltage existing between the transmission lines 10 and 12. The AC voltage wave form thus developed is applied to a cosine multipler 22, to be described more fully hereinafter. The cosine multiplier modifies the amplitude of the input voltage wave form derived from the secondary winding 21 in accordance with the cosine of the phase angle $\theta$ between the volage and current being carried by the transmission lines. The resulting output wave form of the cosine multiplier 22 is thus an AC voltage wave form, the amplitude of which is directly proportional to the product of the voltage and the cosine of $\theta$; this output is applied to a rectifier 24 which rectifies the AC voltage wave form and produces a DC level output having an amplitude proportional to the amplitude of the AC input. The DC level output is subsequently applied to a voltage controlled oscillator 25 (to be described more fully hereinafter). The voltage controlled oscillator receives the DC input level and generates pulses of constant amplitude having a pulse rate or frequency inversely proportional to the DC level. The pulses from the voltage controlled oscillator 25 are applied to an accumulator 26 which has a storage capacity of one thousand pulses. Upon achieving the storage at one thousand pulses, the accumulator 26 delivers an output pulse through a coupling capacitor 30 to a reset hold flip-flop 31. The reset hold flip-flop 31 gates the accumulator 26 to permit the latter to begin accumulation of pulses. Upon achievement of the storage of one thousand pulses in the accumulator 26, the output pulse delivered through the coupling capacitor 30 through the flip-flop 31 results in a non-counting status of the accumulator 26. The counting status of the accumulator 26 begins only upon the recepit of a sampling pulse delivered thereto through a coupling capacitor 32 from a timing circuit 35. Thus, it may be seen that the accumulator 26, upon receipt of a sampling pulse from the timing circuit 35, will begin accumulating pulses from the voltage controlled oscillator 25. When one thousand pulses have been stored, the accumulator will reset itself to the no-count status and remain in the latter status until another sampling pulse is received. The reset hold flip-flop 31, upon receipt of the same sampling pulse from the timing circuit 35, produces a gating level and applies the same to an output gate 36 to enable the gate. The gating level will continue to be supplied by the reset hold flip-flop 31 until an output pulse from the accumulator 26 is applied thereto, at which time the gating level is removed from the gate 36. The timing circuit 35 is a simple divider circuit which, in the embodiment chosen for illustration, produces a single output pulse for every 2160 input pulses. This divider circuit receives 60-cycle pulses so that after accumulating 2160 pulses and producing an output pulse, it may be seen that the output pulse occurs every 36 seconds or every 1/100 of an hour.

The input pulses to the divider circuit 35 are derived from a voltage squaring amplifier 40 which is connected to receive the AC voltage wave form present on the secondary winding 21 of the transformer 15. The squaring amplifier 40 transforms the sinusoidal 60-cycle voltage wave form at the secondary winding 21 into a square wave form of the same frequency. The resulting 60-cycle pulses are applied to the timing circuit 35 to permit the latter to derive its output pulse every 36 seconds or 1/100 of an hour.

A current transformer 50 is provided having windings 51 and 52 inductively coupled to the conductors 10 and 12 to thereby derive a voltage wave form output having an amplitude proportional to the current being carried by the transmission lines. This voltage wave form is applied to a rectifier 53 where it is converted to a DC voltage level proportional to the amplitude of the transformer output voltage wave form. The DC voltage level is applied to a second voltage controlled oscillator 55 where it is converted to pulses of constant amplitude having a pulse rate or frequency directly proportional to the DC level. The pulses from the voltage controlled oscillator 55 are applied directly to the gate 36. It may be seen that these pulses are inhibited from passing through the gate 36 unless the latter receives an enabling signal level from the reset hold flip-flop 31.

The output of the current transformer 50 is also applied to a second voltage squaring amplifier 57 where the AC voltage wave form applied thereto is converted to a square wave in a manner identical to that of the voltage squaring amplifier 40. The resulting square waves from the squaring amplifiers 40 and 57 are not only of equal frequency to their respective input AC voltage wave forms but are also in phase therewith. The outputs from the voltage squaring amplifiers 40 and 57 are applied to a phase comparator 60 which compares and detects phase differences between the two square waves and produces a square wave output having a constant amplitude but a pulse width proportional to the phase difference between the square wave inputs from the voltage squaring amplifiers. It will be apparent that the area beneath the square wave output of the phase comparator will be directly proportional to the phase angle $\theta$ between the detected voltage and current being transmitted by the transmission lines. The square wave output of the phase comparator 60 may thus be integrated in an integrator 61 to produce a DC output, the level of which is proportional to the phase angle $\theta$; the DC level is applied to a cosine function generator 62 which alters the DC level (proportional to angle $\theta$) to produce a second DC level proportional to the cosine of the angle $\theta$. It is this second DC level (proportional to cos $\theta$) that is applied to the cosine multiplier 22 to modify the amplitude of the AC voltage wave form applied thereto from the voltage transformer 15.

The circuits utilized in the blocks of FIG. 1 may be derived from many well known state of the art circuit configurations. For example, the rectifiers 24 and 53 are conventional as is the phase comparator 60, the voltage squaring amplifiers 40 and 57, the timing circuit 35, the accumulator 26 and the reset hold flip-flops 31. Similarly, the regulated power supply 18 may be constructed in accordance with well known design techniques using well understood principles and presently available solid state and integrated circuit elements. For example, circuits that may be used or modified to be used as squaring amplifiers may be found and are discussed in the following publications: "Fairchild Linear Integrated Circuits Applications Handbook," 1967, pages 166–167, "Zero Crossing Dector"; Philbrick Research Inc., "Applications Manual for Computing Amplifiers" 1966, page II.45, "Backlash Simulation." Many references may be found to rectifier designs, such as Burr-Brown "Handbook of Operational Amplifier Applications," 1963, page 70, "Precision Rectifier," and Fairchild Linear Integrated Circuits Applications Handbook, 1967, page 148, "Half Wave Rectifier."

Referring now to FIG. 1, the output of the gate 36 is applied to the terminal 70 for application to a divider 71 which, in the embodiment chosen for illustration, accumulates ten thousand pulses and produces a single pulse output in response thereto. The pulse output of the divider 71 is applied to a series of decade counters 72–76. The decade counters then store the units of power consumption (such as kilowatt hours). Multiple gate serializers 80 and 81 combine to provide a means for serially reading out the contents of the decade counters 72–76. A tone filter 85 is provided to sense command signals on an information transmission line 86. A stop-start command circuit 87 is connected to the tone filter to detect command signals and to initiate operation of a scan synchronizer circuit 88 which, in turn, initiates the readout of the decade counters by the multiple gate serializers. The output of the serializer 81 is applied to a frequency shift transmitter 90 which then encodes the contents of the decade counters for transmission to a remote location. The elements of FIG. 2 and the combination thereof are present state of the art tone transmission techniques and represent no part of the present invention except to the extent that it provides a means for transmitting the information signals from the watt-hour measuring system of the present invention.

Figure 3:
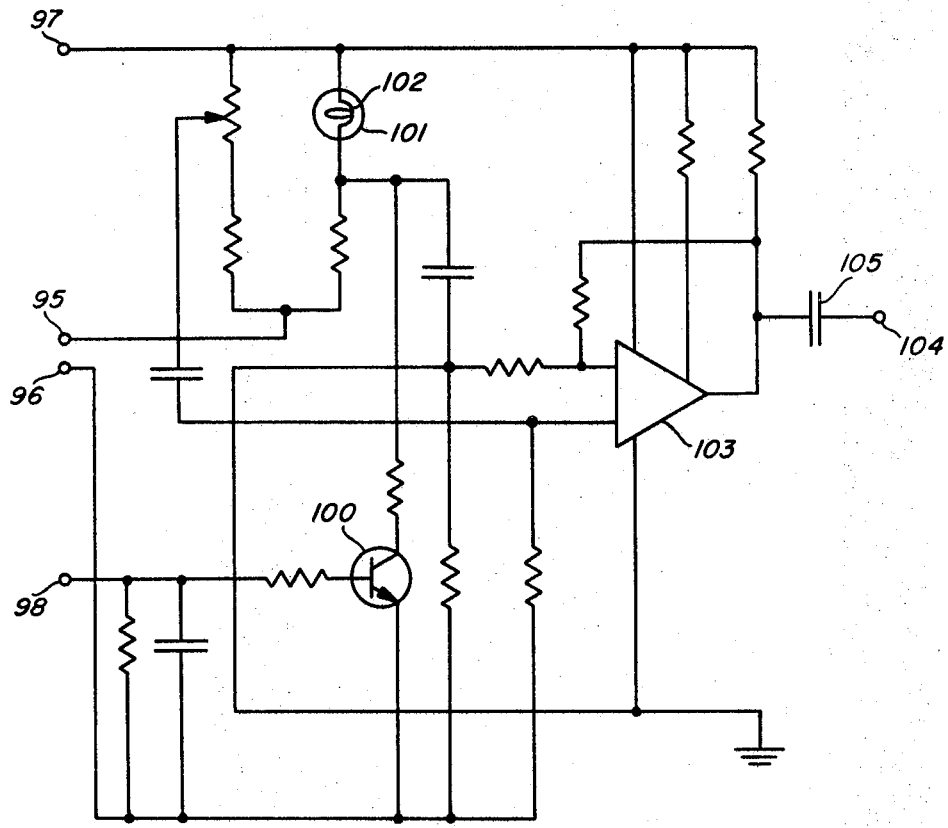
FIG. 3 is a schematic circuit diagram of a circuit for use in the block diagram of FIG. 1.
Figure 4:
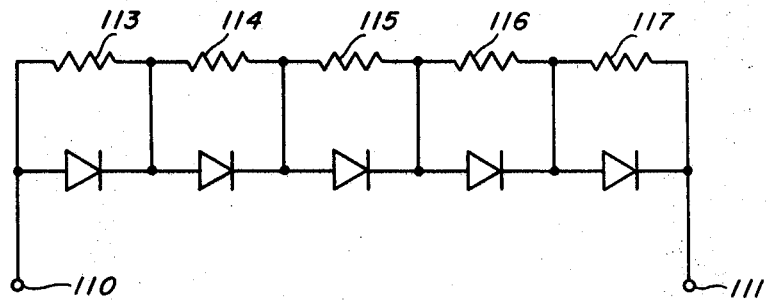
FIG. 4 is a schematic circuit diagram of another circuit for use in the block diagram of FIG. 1.

As mentioned previously, the circuits utilized in the system of the present invention may be derived using present state of the art design techniques and elements; however, a specific circuit for use as a cosine-multiplier and exhibiting unique features is shown in FIG. 3. Referring to FIG. 3, terminals 95 and 96 are provided to receive the AC voltage wave form derived from the secondary winding of the voltage transformer. A suitable bias potential is applied to terminal 97 and terminal 98 provided to receive the DC voltage level proportional to cosine $\theta$. The voltage level acting on the base electrode of transistor 100 operates to vary the DC current through a lamp 101. The resistance of the filament 102 in the lamp thus varies proportional to the DC level applied to the circuit at the terminal 98 from the cosine functional generator. The resistance varies by reason of the change in temperature. The AC voltage wave form applied to terminals 95 and 96 is thus effectively "multiplied" by reason of the changing voltage drop across the lamp 101 with the resulting modified voltage level applied to the input of amplifier 103 prior to application to an output terminal 104 through a coupling capacitor 105. The DC level representing cosine $\theta$ is derived by a simple state of the art functional generator such as that shown in FIG. 4 wherein a DC level is applied to a terminal 110 and that DC level modified in accordance with a cosine is provided at terminal 111. The cosine function is derived by properly choosing the values of resistances 113–117. Discussion of function generators of this type may be found in Korn and Korn, McGraw-Hill, 1952.

The voltage controlled oscillators of the system of the present invention may be designed in a variety of means using well known techniques. The purpose of the voltage controlled oscillators is to receive a DC signal level and produce a pulse output, the pulse rate of which is proportional or inversely proportional to the DC voltage level. FIG. 6 is a schematic circuit diagram of a circuit that may be used in the system of the present invention. A DC signal is applied to the terminal 120 and thus to the base electrode of a transistor 121. The transistor acts as an input to an amplifier 122 to provide an appropriate DC level input to transistor 123 and subsequently to an oscillator formed by transistors 124, 125, 126 and 127. The circuit is voltage-sensitive in that the frequency of oscillation varies with the voltage applied thereto. The amplitude of the output pulses is constant and is regulated to a desired level.

The description of the system of the present invention may be aided by reference to the wave forms of FIG. 5. The voltage induced in the secondary winding 21 of the voltage transformer 15 is an AC voltage wave form having an amplitude proportional to the amplitude of the voltage being measured. The voltage wave form occurs in FIG. 1 at A and is shown as wave form A in FIG. 5. This wave form is applied to the cosine multiplier 22 wherein the amplitude of the AC voltage wave form is reduced in accordance with the value of the cos $\theta$. The resulting AC voltage wave form is thus proportional to $E \cos \theta$ and occurs at B in FIG. 1 and is shown as wave form B in FIG. 5. Voltage wave form B is rectified by the rectifier 24 and occurs at C of FIG. 1 as a DC voltage level which is represented in FIG. 5 as wave form C. The application of this DC level to the voltage controlled oscillator 25 produces a series of output pulses, the frequencies of which are inversely proportional to the voltage level applied thereto. The pulse rate is therefore proportional to $E \cos \theta$ and the pulses occur at D in FIG. 1 and are shown in wave form D in FIG. 5. The pulses from the voltage controlled oscillator 25 are accumulated in the accumulator 26 until one thousand pulses have been stored. Upon the storage of one thousand pulses in the accumulator 26, an output pulse is delivered thereby and occurs at E in FIG. 1 and is shown as wave form E in FIG. 5.

The current transformer 50 produces an AC voltage wave form occuring at F in FIG. 1 and shown as voltage wave form F in FIG. 5. The amplitude of this AC voltage wave form is proportional to the amplitude of the current carried by the transmission lines. This voltage wave form is applied to a rectifier 53 to derive a DC voltage level occurring at G in FIG. 1 and represented by wave form G in FIG. 5 which is subsequently applied to the second voltage controlled amplifier 55. Voltage controlled oscillator 25 produces a series of pulses the frequencies of which are proportional to the amplitude of the DC voltage level G. These pulses occur at H in FIG. 1 and are represented by the wave form H in FIG. 5.

The voltage occurring on the secondary winding 21 of the voltage transformer 15 is applied to the voltage squaring amplifier 40 to be converted into a square wave occurring at I in FIG. 1 and shown as wave form I in FIG. 5. Similarly, the voltage derived from the current transformer 50 is applied to a voltage squaring amplifier 57 to produce a square wave occurring at J in FIG. 1 and represented by the wave form J in FIG. 5. Both wave forms are applied to the phase comparator 60 and, in the embodiment chosen for illustration, the two square wave forms exhibit a phase displacement relative to each other. An inspection of wave forms I, J, and K of FIG. 5 will demonstrate that the phase displacement between the wave forms I and J is represented by the wave form K; accordingly, the output of the phase comparator occurring at K in FIG. 1 is a square wave, the area of which is proportional to the phase difference (or phase angle) between the voltage wave forms I and J. The wave form K derived from the phase comparator 60 is applied to an integrator 61 which results in a DC voltage level occurring at L and shown as wave form L in FIG. 5. This DC voltage wave form is modified in the cosine functional generator 62 which produces a DC voltage output proportional to the cosine of the phase angle $\theta$. This DC voltage level occurs at M in FIG. 1 and is represented by the wave form M in FIG. 5.

The square wave output derived from the voltage squaring amplifier 40 (the frequency of the square waves obviously being the same as the frequency of the measured power voltage—60 Hz.) is applied to the timing circuit 35 which accumulates 2160 pulses and generates a single pulse in response thereto. This single pulse output occurring at N in FIG. 1 and shown as wave form N in FIG. 5 therefore occurs every 36 seconds or $\frac{1}{100}$ of an hour. Assuming that the accumulator 26 has just received a pulse such as the wave form N, the accumulator will begin accumulating one thousand pulses from the voltage controlled oscillator 25. When one thousand pulses have been accumulated, a pulse (wave form E) will reset the accumulator 26 and will also reset the reset hold flip-flop 31. The pulse from the timing circuit 35 (wave form N) had also been delivered to the flip-flop 31 to cause the latter to generate an enabling signal level for the gate 36. Thus, during the time that the accumulator 26 is accumulating 1000 pulses from the voltage controlled oscillator 25, the gate 36 will remain open. During the open condition of the gate 36, pulses derived from the second voltage controlled oscillator 55 will be passed therethrough. The resulting output of the gate 36 will occur at O in FIG. 1 and is represented by the wave form O in FIG. 5. It may be seen that when a timing period occurs, the gate 36 will be opened to admit pulses having a frequency proportional to the amplitude of the current being transmitted in the transmission lines. The length of time that the gate 36 is open will depend on the time required for the accumulator 26 to accumulate one thousand pulses from the first voltage controlled oscillator 25. The wave form resulting at the output of the gate 36 will therefore be successive "bursts" of pulses, the frequency of the pulses in each burst being proportional to the current between the total number of pulses being proportional to $EI \cos \theta$. The sampling frequency or the time interval between successive samplings will depend on the accuracy required of the system. In the embodiment chosen for illustration, the timing circuit 35 was arranged to provide two output pulses for every 2160 input pulses. Translated, this means that for a 60 Hz. input pulse frequency, one pulse will be delivered by the timing circuit every 1/100 of an hour or every 36 seconds. This sampling frequency places the system well within the accuracy requirements of present-day power consumption measurement requirements; however, the accuracy may be increased manyfold by simply decreasing the time interval between sampling pulses.

Figure 2:
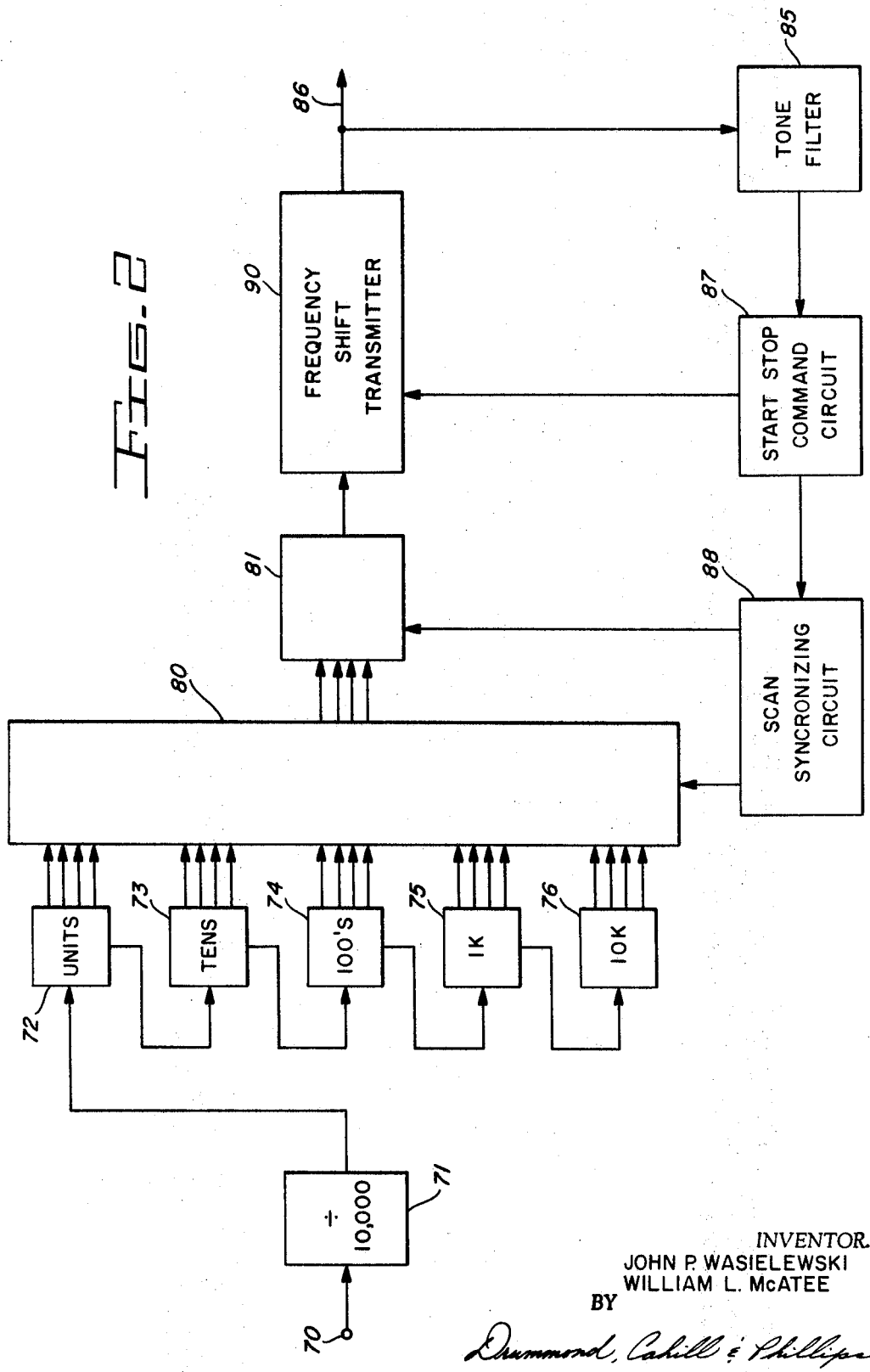
FIG. 2 is a block diagram of a pulse storage arrangement for storing and transmitting pulses to a remote location, the storage arrangement intended for connection to the measurement system as shown in FIG. 1.

The output occurring at 0 in FIG. 1 is applied to the terminal 70 of the arrangement shown in FIG. 2. The divider 71 accumulates 10,000 pulses prior to initiating a single pulse for application to the decade counters 72–76. The decade counters are provided to store a binary coded decimal equivalent of the power consumed. The multiple gate serializers 80 and 81 sequentially receive the BCD code from the successive decade counters and serially transmit these numbers through the frequency shift transmitter which tone encodes the numbers for transmission over a line 86. The decade counters can store a running total of power consumed in much the same manner as the dials of a conventional watt-hour meter. Readout of the system can occur by a simple tone encoded start command which is dictated by the tone filter and command circuit to initiate transmission of the information stored in the decade counters.

A further understanding of the system of the present invention may be derived from an example of a measurement of a quantity of power such as a kilowatt hour. For simplicity, it will therefore be assumed that the transmission lines are delivering power at a voltage of one hundred volts, 10 amps, and a phase angle of zero. The amplitude of the voltage wave form A at the input to the cosine multiplier 22 will be proportional to 100 volts; since the angle $\theta$ is equal to zero, the cosine of the angle for one and the amplitude of the voltage wave form B at the output of the cosine multiplier will still be proportional to 100 volts. This wave form is applied to the rectifier 24 which, in response to the AC voltage wave form applied thereto representative of 100 volts on the transmission lines, will produce an output voltage of one volt. The voltage wave form C is thus at a level of one volt. A one-volt input to the voltage controlled oscillator 25 will result in an output pulse frequency of 1,000 Hz. Thus, the wave form D has a pulse frequency of one thousand.

Similarly, the voltage wave form F will have an amplitude proportional to the current being carried by the transmission lines and when applied to the rectifier 53 will result in a DC voltage level G of 0.01 volts. The voltage controlled oscillator 55 will produce output pulses having a frequency of 100 Hz. As described previously, the timing circuitry 35 will produce a timing pulse (wave form N) which will start the accumulation of one thousand pulses in the accumulator 26; simultaneously, the reset hold flip-flop will enable the gate 36 to thereby permit the 100 Hz signal from the voltage controlled oscillator 55 to pass therethrough to the divider 71 of FIG. 2. Since the frequency of the pulses being applied to the accumulator 26 is one thousand Hz., it will require one second for the accumulator to accumulate one thousand pulses. Thus, one second after the timing pulse is applied to the accumulator 26, it will produce an output pulse and reset itself. The output pulse of the accumulator when applied to the reset hold flip-flop 31 will result in the removal of the enabling voltage level at the gate 36 to thus close the gate to the passage of pulses from the second voltage controlled oscillator 55. Since the pulses from the second voltage controlled oscillator 55 were at a frequency of 100 Hz. and since the gate 36 was enabled for a period of one second, a total of one hundred pulses will have passed the gate 36 to the divider 71. 1/100 of an hour later (36 seconds) a second timing pulse will be delivered to the accumulator 26 and the reset hold flip-flop 31. The accumulator 26 will again accumulate one thousand pulses from the voltage controlled oscillator 25 in a period of one second during which a total of one hundred pulses from the second voltage controlled oscillator 55 will have passed through the gate 36 to the divider 71. This process repeats itself every 36 seconds or every 1/100 of an hour so that at the end of one hour (100 sampling pulses), a total of 100 times 100 or 10,000 pulses will have passed the gate 36 into the divider 71. Since the divider 71 produces one output pulse for every 10,000 input pulses, a single output pulse will be derived at the end of the hour. This output pulse will be stored in the units decade counter 72, thereby storing an indication of the utilization of one kilowatt for a period of one hour or an indication of the utilization of one kilowatt hour of power.

The functional requirements of each of the subsystems of the present system can be satisfied by numerous circuit designs lending themselves to miniaturization through the utilization of solid state and integrated circuit devices. The system is adaptable to the environment in which it is to be used and may have any accuracy desired by simply changing the sampling rate. The system may also use circuit having standard components without having to rely on expensive high-performance, low-tolerance components. A convenient modification may be made in the system of the present invention if desired by arranging to multiply the AC voltage wave form representing the amplitude of the current rather than the wave form representing the amplitude of the voltage being carried by the transmission lines; this modification would first derive a quantity proportional to $I \cos \theta$ rather than $E \cos \theta$. The subsequent sampling and timing would still provide for an output proportional to $EI \cos \theta$.

It will therefore be obvious to those skilled in the art that the many modifications may be made in the system of the present invention without departing from the spirit and scope thereof.

We claim:

1. A power measuring system for measuring AC power consumption being transmitted through electrical conductors, said system including: a voltage transformer connected to said electrical conductors for developing an alternating voltage, the amplitude of which is proportional to the amplitude of the voltage of said electrical conductor; a current transformer inductively coupled to said electrical conductors for developing an alternating voltage, the amplitude of which is proportional to the amplitude of the current in said electrical conductors; means connected to said transformer for developing a first and a second series of pulses, the frequency of said second series being proportional to the amplitude of the voltage developed by one of said transformers and the frequency of said first series of pulses being proportional to the amplitude of the voltage developed by the other of said transformers multiplied by the cosine of the phase angle between the voltages developed by said transformers; a pulse accumulator having a count and a no-count status connected to receive said first series of pulses for temporarily storing pulses therefrom when in the count status and for automatically assuming a no-count status after a predetermined count is reached; timing means connected to said pulse accumulator means for switching the latter to the count status at predetermined intervals; gate means connected to receive said second series of pulses and responsive to the count status of said pulse accumulator for gating pulses of said second series of pulses through said gate means, and responsive to the no-count status of said pulse accumulator for inhibiting the passage of pulses through said gate means.

2. The combination set forth in claim 1, wherein said means connected to said transformers for developing a first and second series of pulses includes first and second voltage controlled oscillators.

3. The combination set forth in claim 1, wherein said timing means comprises a divider connected to receive an input having a frequency equal to the frequency of the alternating current being transmitted and responsive to a predetermined number of alternations of said current to produce an output pulse.

4. A power measuring system for measuring AC power consumption being transmitted through electrical conductors, said system including: a voltage transformer connected to said electrical conductors for developing an alternating voltage, the amplitude of which is proportional to the amplitude of the voltage of said electrical conductor; a current transformer inductively coupled to said electrical conductors for developing an alternating voltage, the amplitude of which is proportional to the amplitude of the current in said electrical conductors; phase comparator circuit means connected to said transformers responsive to the phase angle between the voltages developed by said transformers for generating a DC signal having an amplitude proportional to the cosine of said angle; a multiplier circuit connected to said phase comparator and said voltage transformer for generating a voltage proportional to $E \cos \theta$; first and second voltage controlled oscillators responsive to the output voltage of said multiplier circuit and said current transformer respectively for producing pulse outputs, the pulse rates of which are proportional to $E \cos \theta$ and proportional to I respectively; pulse accumulation means having a count and a no-count status connected to said first voltage controlled oscillator for receiving and temporarily storing pulses therefrom when in the count status and for automatically assuming a no-count status after a predetermined count is reached; timing means connected to said pulse accumulation means for switching the latter to the count status at predetermined intervals; gate means connected to said second voltage controlled oscillator responsive to the count status of said pulse accumulation means for gating pulses from said second voltage controlled oscillator, and responsive to a no-count status of said pulse accumulation means for blocking pulses from said second voltage controlled oscillator.

5. A power measuring system for measuring AC power consumption being transmitted through electrical conductors, said system including: a voltage transformer connected to said electrical conductor for developing an alternating voltage, the amplitude of which is proportional to the amplitude of the voltage on said electrical conductor; a current transformer inductively coupled to said electrical conductors for developing an alternating voltage, the amplitude of which is proportional to the amplitude of the current in said electrical conductors; first and second square wave producing circuits connected to said voltage and current transformers respectively, each for producing square waves in phase with the voltage and current respectively being transmitted by said electrical conductors; a phase comparator connected to said square wave producing circuits for producing a pulse output having a frequency equal to the frequency of the voltage and current and having a pulse width proportional to the phase angle between the voltage and current being transmitted by said electrical conductors; and intergrator connected to said phase comparator for integrating said pulse output and producing a direct current having an amplitude proportional to said pulse width; a cosine function circuit connected to said integrator for altering the direct current output of said integrator and providing a direct current level proportional to the cosine of said phase angle; a multiplier circuit connected to said cosine function circuit and to said voltage transformer for altering the amplitude of said alternating voltage to provide an alternating voltage having an amplitude proportional to the product of the voltage times the cosine of the phase angle between the voltage and current being transmitted by said electrical conductors; first and second rectifier circuits connected to said multiplier circuit and said current transformer respectively for producing a direct current voltage having an amplitude proportional to the product of the transmitted voltage and the cosine of the angle between the voltage and current, and a DC voltage proportional to the amplitude of the transmitted current respectively; first and second voltage controlled oscillators connected to said first and second rectifier circuits respectively for producing pulse outputs, the pulse rates being proportional to the product of the transmitted voltage and the cosine of the angle between the voltage and current and proportional to the transmitted current respectively; pulse accumulation means having a count and a no-count status connected to said first voltage controlled oscillator for receiving and temporarily storing pulses therefrom when in the count status and for assuming a no-count status after a predetermined count is reached; timing means connected to said pulse accumulation means for switching the latter to the count status at predetermined intervals; gate means connected to said second voltage controlled oscillator responsive to the count status of said pulse accumulation means for gating pulses from said second voltage controlled oscillator, and responsive to a no-count status of said pulse accumulation means for blocking pulses from said second voltage controlled oscillator.

References Cited
UNITED STATES PATENTS 2,919,408 12/1959 Brown _____ 324—142
3,084,863 4/1963 DuVall _____ 324—142 X ALFRED E. SMITH, Primary Examiner U.S. Cl. X.R.

235—194